United States Patent [19]

Yamazaki et al.

[11] Patent Number: 4,904,003
[45] Date of Patent: Feb. 27, 1990

[54] LATCH DEVICE FOR INCLINABLE BACK REST CUSHION MOUNTED IN SEATBACK

[75] Inventors: Hiroshi Yamazaki; Toshiyuki Hara, both of Yokohama; Yuji Tanaka; Takayuki Mouri, both of Ayase, all of Japan

[73] Assignees: Ikeda Bussan Co., Ltd., Ayase; Ohi Seisakusho Co., Ltd., Yokohama, both of Japan

[21] Appl. No.: 146,066

[22] Filed: Jan. 20, 1988

[30] Foreign Application Priority Data

Jan. 23, 1987 [JP] Japan ................................. 62-8522
Apr. 30, 1987 [JP] Japan ................................ 62-65887

[51] Int. Cl.⁴ ............................................. B60N 1/10
[52] U.S. Cl. .................................. 292/126; 296/65.1; 297/379; 292/127; 292/195
[58] Field of Search ................. 296/65.1, 63; 297/379; 292/127, 126, 128, DIG. 14, DIG. 43, 332, 336, 121, 216, 198, 99, 195

[56] References Cited

U.S. PATENT DOCUMENTS

| | | | |
|---|---|---|---|
| 2,809,064 | 10/1957 | Dlugatch | 292/226 |
| 4,636,005 | 1/1987 | Bolz et al. | 296/65.1 X |
| 4,637,648 | 1/1987 | Okino et al. | 296/63 |
| 4,667,492 | 5/1987 | Tomatsu et al. | 297/379 X |
| 4,684,175 | 8/1987 | Trutter | 297/379 |
| 4,765,682 | 8/1988 | Satoh | 297/379 |
| 4,779,927 | 10/1988 | Trutter et al. | 297/379 |

FOREIGN PATENT DOCUMENTS

| | | | |
|---|---|---|---|
| 3505047 | 6/1986 | Fed. Rep. of Germany | 297/379 |
| 82638 | 7/1981 | Japan | 297/379 |
| 59-149833 | 8/1984 | Japan . | |
| 59-190635 | 12/1984 | Japan . | |
| 59-190635 | 12/1984 | Japan . | |
| 61-21836 | 1/1986 | Japan . | |
| 61-21837 | 1/1986 | Japan . | |
| 61-24638 | 2/1986 | Japan . | |
| 57436 | 3/1986 | Japan | 297/379 |
| 61-220944 | 10/1986 | Japan . | |
| 220944 | 10/1986 | Japan | 296/65.1 |
| 61-229625 | 10/1986 | Japan . | |
| 2182620 | 5/1987 | United Kingdom . | |

Primary Examiner—Gary L. Smith
Assistant Examiner—Eric K. Nicholson
Attorney, Agent, or Firm—Foley & Lardner, Schwartz, Jeffery, Schwaab, Mack, Blumenthal & Evans

[57] ABSTRACT

Herein disclosed is a latch device for latching an inclinable bark rest cushion to a seatback of a seat when the cushion is snugly received in a tunnel formed in the seatback. The latch device comprises a striker secured to the seatback, a latch member pivotally mounted in the cushion, a spring incorporated with the latch member to bias the same in a direction to achieve a latched engagement between the latch member and the striker, an actuation member pivotally mounted in the cushion in a manner to push and pivot the latch member in a releasing direction to cancel the latched engagement between the latch member and the striker when pivoted in a given direction, means having a pin portion which is projectable into a travelling way of the actuation member thereby to interrupt the actuation member from pivoting in the releasing direction, a base member secured to a rigid portion of the cushion and having an opening through which the pin portion passes, and a mechanism for manually actuating the pin portion from a back side of the back rest cushion.

21 Claims, 9 Drawing Sheets

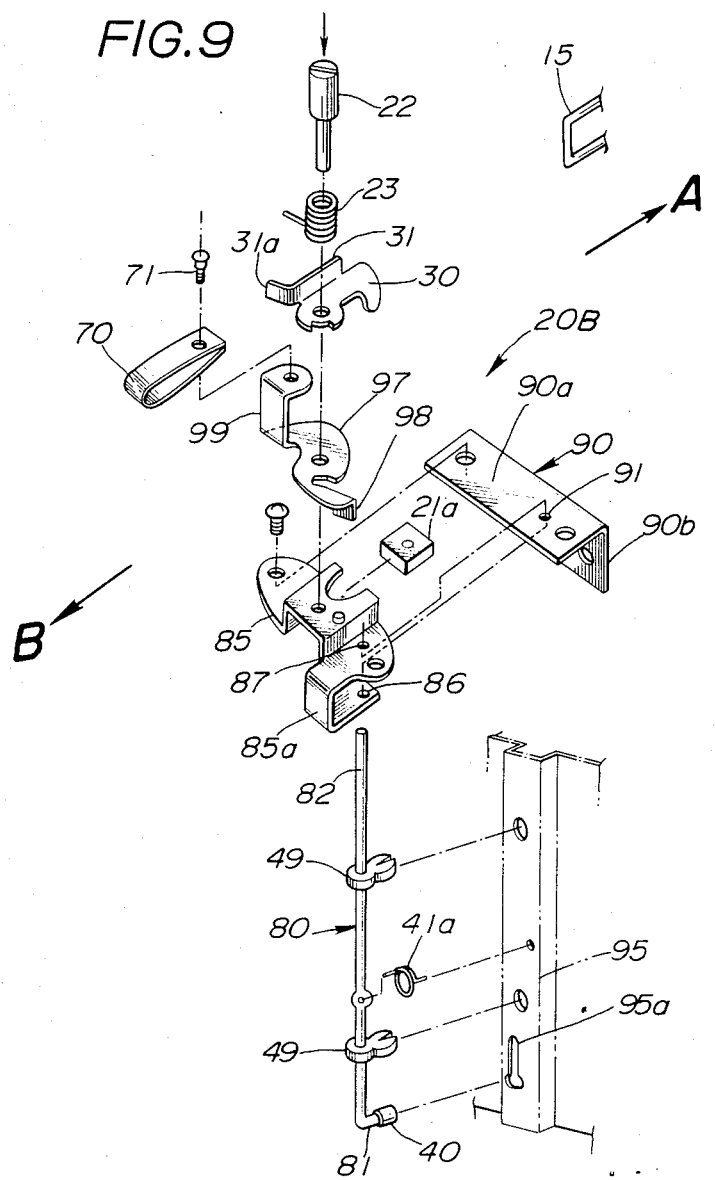

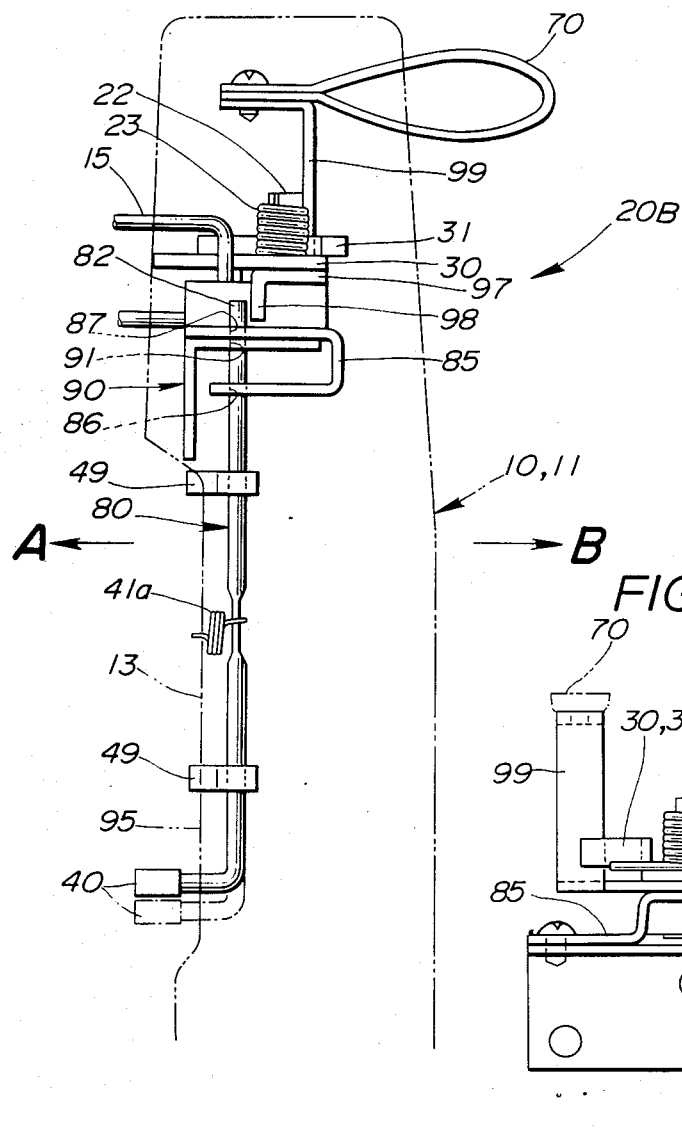

LATCH DEVICE FOR INCLINABLE BACK REST CUSHION MOUNTED IN SEATBACK

BACKGROUND OF THE INVENTION

1. Field of the Invention

The present invention relates in general to latch devices, and particularly to latch devices of a type which latches a pivotal member. More specifically, the present invention is concerned with a latch device for latching an inclinable back rest cushion which is pivotally mounted in a rear seat seatback of a passenger motor vehicle to provide, when folded, a tunnel between a passenger room and a trunk room.

2. Description of the Prior Art

Hitherto, various latch devices of the above-mentioned type have been proposed and put into practical use particularly in the field of passenger cars.

In order to clarify the task of the present invention, two conventional latch devices will be outlined, which are disclosed in Japanese Utility Model First Provisional Publication No. 59-190635 and Japanese Patent First Provisional Publication No. 59-149833.

In the device of Publication No. 59-190635, a striker is fixed to a vehicle body, and a hook engageable with the striker is mounted to the inclinable back rest. A push button is mounted on the back rest to actuate the hook. A pull strap extends from the push button and is exposed to the passenger room. When the pull strap is pulled from the passenger room, the push button is moved and thus the hook is actuated to release the engagement with the striker. A latch slider operable from the trunk room is incorporated with the push button to disable the same from moving. Once the latch slider assumes its operative position, the push button does not move even when the pull strap is pulled. Thus, under this, the latched engagement between the hook and the striker is not released.

In the device of Publication No. 59-149833, a striker is fixed to an inclinable back rest, and a hook is mounted to a vehicle body. A handle member is pivotally mounted on the vehicle body to actuate the hook. An operation lever operable from a trunk room is incorporated with the handle member. A connecting member is incorporated with the handle member and actuated by the operation lever. When, with manipulation of the operation lever, the connecting member is moved to a given position relative to the handle member, manipulation of the handle member actuates the hook in a direction to cancel the latched engagement between the hook and the striker. When, due to manipulation of the operation lever, the connecting member is moved to another given position, manipulation of the handle member does not actuate the hook. Thus, under this condition, the latched engagement between the hook and the striker is not released.

However, due to their inherent constructions, the above-mentioned conventional latch devices have the following drawbacks:

That is, in the device of Publication No. 59-190635, it is inevitably necessary to increase the mechanical strength of the push button and parts directly incorporated therewith and thus enlarge the size of them in order to stand against a big force applied thereto through the pull strap. In fact, when, for example, a child on a rear seat pulls the pull strap strongly just for fun, a big stress is applied to the push button and its incorporated parts. As is known, increase in size and strength of the parts induces a bulky and high cost construction of the lock device.

In the device of Publication No. 59-149833, the problems encountered in the above-mentioned conventional device are solved because of usage of a so-called "air striking mechanism". However, due to numerous parts including the hook, the handle member, the connecting member and operation links which are installed in the device, the construction of the same is complicated and cost of the same is increased.

SUMMARY OF THE INVENTION

It is therefore an object of the present invention to provide an improved latch device for the afore-mentioned inclinable back rest, which is free of the drawbacks encountered in the above-mentioned conventional lock devices.

According to he present invention, there is provided, in a seatback which is provided in a tunnel thereof with an inclinable back rest cushion, a latch device for latching the back rest cushion to the seatback when the cushion is snugly received in the tunnel. The latch device comprises a striker secured to the seatback; a latch member pivotally mounted in the back rest cushion in a manner to latchingly engage with the striker upon the cushion being received in the tunnel; first biasing means for biasing the latch member in a direction to achieve the latched engagement between the latch member and the striker; an actuation member pivotally mounted in the back rest cushion in a manner to push and pivot the latch member in a releasing direction to cancel the latched engagement between the latch member and the striker when pivoted in a given direction; second means having a pin portion which is projectable into a travelling way of the actuation member thereby to interrupt the actuation member from pivoting in the releasing direction; a base member secured to a rigid portion of the back rest cushion and having an opening through which the pin portion slidably passes; and third means for manually actuating the second means from a back side of the back rest cushion.

BRIEF DESCRIPTION OF THE DRAWINGS

Other objects and advantages of the present invention will become clarified from the following description when taken in conjunction with the accompanying drawings, in which:

FIGS. 1 to 8 are drawings showing a first embodiment of the present invention, in which:

FIG. 1 is an exploded view of a latch device of the first embodiment of the invention;

FIG. 2 is a perspective view of an automotive rear seat which is provided at a seatback thereof with an inclinable back rest cushion to which the latch device of the invention is practically applied;

FIG. 3 is a sectional view of the inclinable back rest cushion in its raised latched condition, showing a top view of the latch device;

FIG. 4 is a transparent view of the inclinable back rest cushion, showing a plan view of the latch device;

FIG. 5 is an enlarged plan view of the latch device shown in FIG. 4;

FIG. 6 is an enlarged top view of the latch device shown in FIG. 3; and

FIGS. 7 and 8 are enlarged side views of latch device, showing different conditions of the same;

FIGS. 9 to 11 are drawings showing a second embodiment of the present invention, in which:

FIG. 9 is an exploded view of a latch device of the second embodiment of the present invention;

FIG. 10 is an enlarged side view of the latch device of the second embodiment;

FIG. 11 is a back view of an essential part of the latch device of the second embodiment.

DETAILED DESCRIPTION OF THE INVENTION

FIGS. 1 to 8 show a first embodiment of the present invention.

Figure 2:
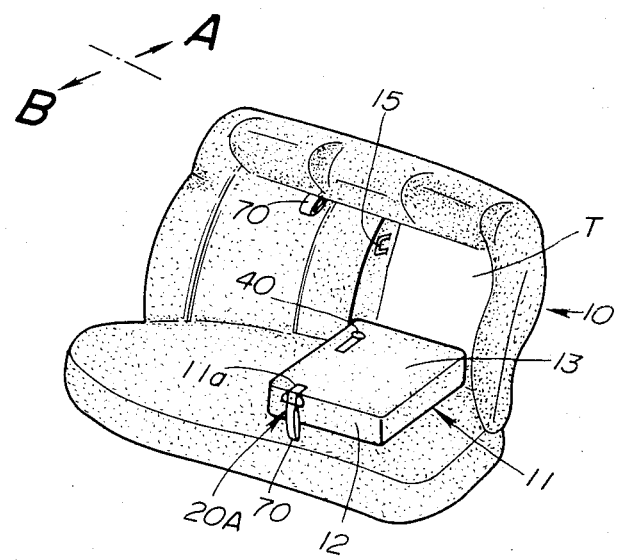

Referring to FIG. 2, there is shown an automotive rear seat which comprises a seat cushion and a seatback 10. The seatback 10 is equipped with an inclinable back rest cushion 11. The cushion 11 is usually received in a tunnel "T" formed in the seatback 10. When the cushion 11 is folded as shown in the drawing, the tunnel "T" is exposed to connect a passenger room "B" with a trunk room "A". Although not well shown in the drawing, a known hinge device is arranged between a rear end of the seat cushion and a lower portion of the back rest cushion 11 to achieve a pivotal movement of the cushion 10 relative to the seatback 10.

A latch device 20A of the first embodiment is mounted to the inclinable back rest cushion 11 to move therewith. As is seen from FIG. 2, the latch device 20A is substantially entirely installed in the back rest cushion 11. Designated by numeral 11a is a slot which is formed in the back side of the back rest cushion 11 for receiving therein a striker 15 upon raising of the cushion 11.

Figure 1:
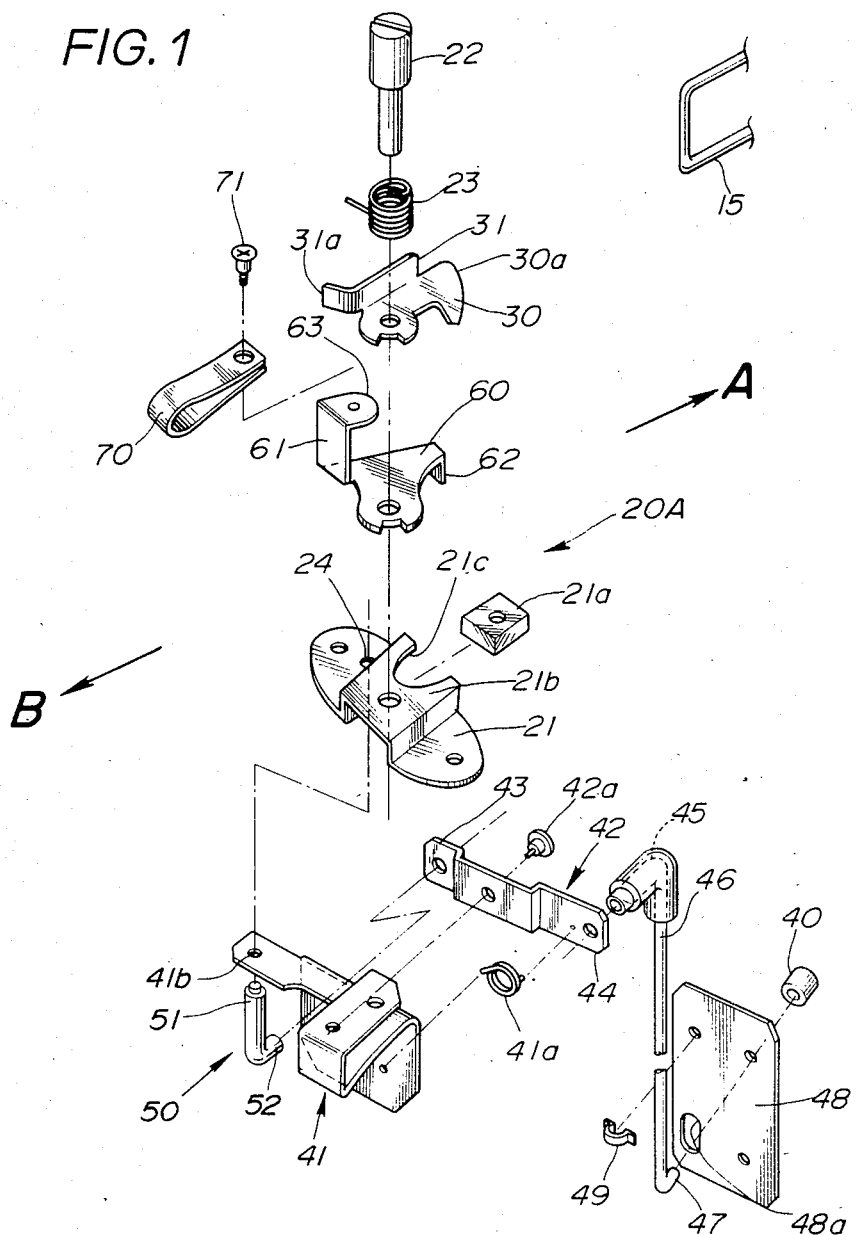
Figure 3:
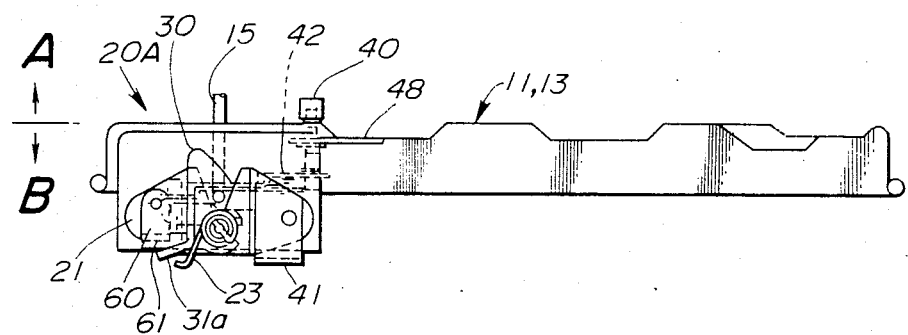
Figure 4:
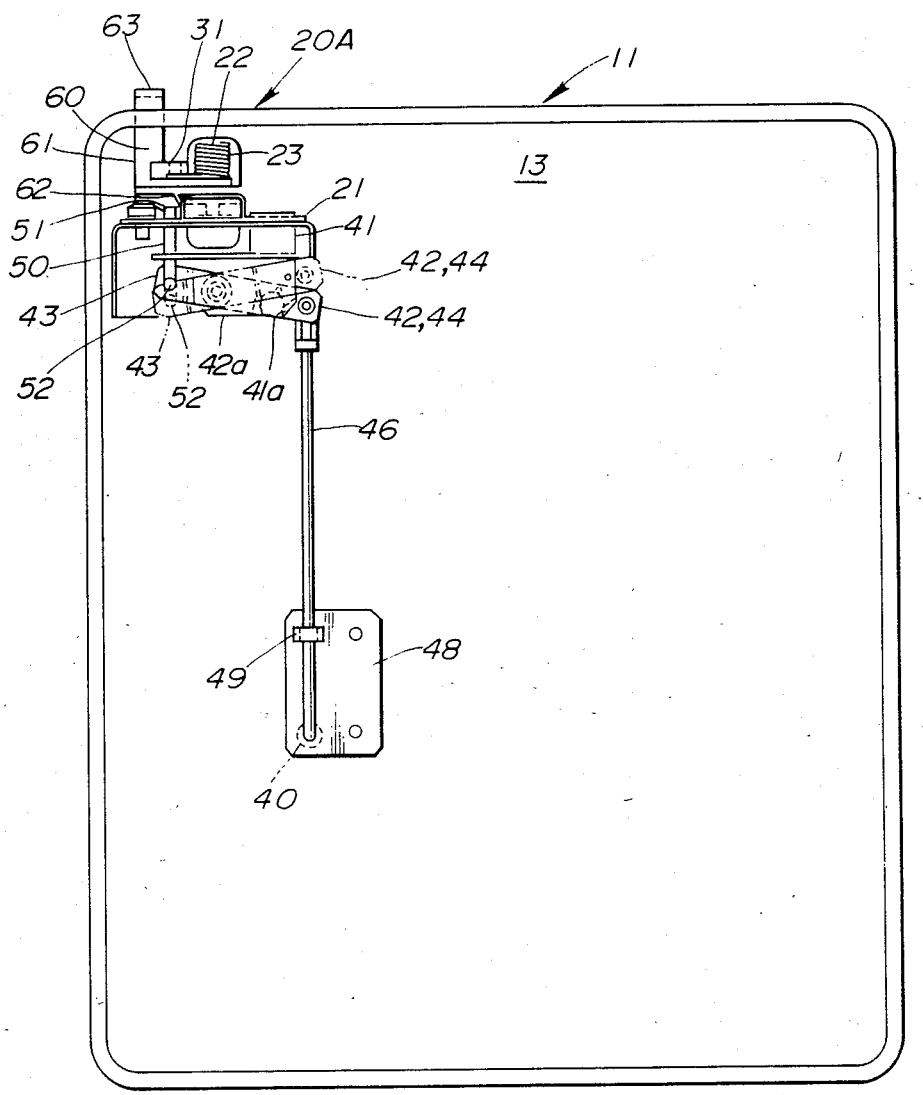

As is understood from FIGS. 3 and 4, and FIG. 1, the latch device 20A comprises a base member 21 which is secured to a rigid frame member (not shown) installed in a free upper portion 12 (see FIG. 2) of the back rest cushion 11.

As is seen from FIG. 1, the base member 21 has a raised center portion 21b or housing therein a bumper rubber piece 21a. It is to be noted that the parts shown in FIG. 1 are so oriented that the left side of the drawing faces the passenger room "B" and the right side faces the trunk room "A". The raised center portion 21b is formed with a semicircular cut 21c through which the bumper rubber piece 21a is exposed. Upon raising of the back rest cushion 11, the striker 15 abuts against the rubber piece 21a to bump the movement of the cushion 11. A pivot shaft 22 is fixed to the raised center portion 21b of the base member 21, which extends upward therefrom.

A latch member 30 is pivotally disposed about the pivot shaft 22. As will be described in detail hereinafter, the latch member 30 is latchingly engageable with the striker 15 which is secured to a wall of the tunnel "T" (see FIG. 2). For this, the latch member 30 is arranged to be exposed to the slot 11a of the back rest cushion 11. The latch member 30 is formed with a raised flange 31 having a bent end 31a. A coil spring 23 is disposed about the pivot shaft 22 having one end hooked to the raised flange 31 of the latch member 30 and the other end hooked to the pivot shaft 22. With this spring 23, the latch member 30 is biased to rotate in a clockwise direction in FIG. 3, that is, in a direction to achieve latched engagement with the striker 15.

An actuation member 60 is also pivotally disposed about the pivot shaft 22 at a position between the base member 21 and the latch member 30. The actuation member 60 is formed with an upwardly extending portion 61 and a downwardly extending portion 62. As is seen from FIG. 1, upon assembly, the upwardly extending portion 61 is placed behind the raised flange 31 of the latch member 30. A top of the upwardly extending portion 61 is bent to form a flat portion 63 to which a pull strap 70 is connected through a screw 71. The pull strap 70 is so sized that upon the inclinable back rest cushion 11 assuming its raised latched position, at least a portion of the strap 70 is exposed to the passenger room "B" to be manipulated by a seat occupant. Usually, due to the biasing force of the spring 23, the bent end 31a of the latch member 30 abuts on the upwardly extending portion 61 of the actuation member 60 thereby to bias the same in a clockwise direction in FIG. 3. Thus, when the pull strap 70 is pulled against the biasing force of the spring 23, the latch member 30 is pivoted in a counterclockwise direction in FIG. 3, that is, in a direction to release the latched engagement between the latch member 30 and the striker 15. This latch releasing operation is suppressed by an interfering mechanism which will be described in the following.

The interfering mechanism comprises a stopper pin 50 which slidably passes through an opening 24 formed in the base member 21. The opening 24 is so positioned that when the stopper pin 50 assumes its raised or upper position, it intersects the travelling way of the downwardly extending portion 62 of the actuation member 60 for the reason which will be clarified as the description proceeds. The stopper pin 50 has a reduced head portion 51 and a bent lower portion 52.

For actuation of the stopper pin 50 from the trunk room "A", an actuation mechanism is incorporated with the stopper pin 50. The actuation mechanism comprises a pivoting lever 42 which is pivotally connected through a pivot pin 42a to a guide bracket 41. The guide bracket 41 is secured to a rigid member (not shown) of the inclinable back rest cushion 11. The bracket 41 has an arm which has an opening 41b through which a major portion of the stopper pin 50 slidably passes. The pivoting lever 42 has one arm part 43 which has an opening (no numeral) into which the bent lower portion 52 of the stopper pin 50 is slidably inserted to achieve a pivotal connection therebetween and the other arm part 44 which has an opening (no numeral) to which a bent upper end 45 of an elongate rod 46 is pivotally connected through a known clip (no numeral). A turnover spring 41a is disposed between the pivoting lever 42 and the guide bracket 41 in order to make a turn over action of the pivoting lever 42. That is, when a pivoting movement of the pivoting lever 42 in one direction goes beyond a predetermined angle, the movement is violently accelerated by the spring 41a in a snap action manner.

The elongate rod 46 extends downward toward a base plate 48 which is secured to another rigid structure of the inclinable back rest cushion 11. The base plate 48 has an elongate slot 48a through which a bent lower end 47 of the rod 46 is projected into the outside of the back rest cushion 11. A control knob 40 is fixed to the outwardly projected part of the bent lower end 47. A rod holder 49 is fixed to the base plate 48 to slidably hold the rod 46. Usually, due to work of the turn-over spring 41a, the control knob 40 assumes either one of the uppermost and lowermost positions defined by the elongate slot 48a of the base plate 48. As is understood from FIG. 5, when the control knob 40 assumes the uppermost position as illustrated by a phantom line, the stopper pin 50 assumes its lower or inoperative position, while when the control knob 40 assumes the lowermost position as illustrated by a broken line, the stopper pin 50 assumes its upper or operative position, that is, the position to interfere the pivotal movement of the aforementioned actuation member 60.

Figure 5:
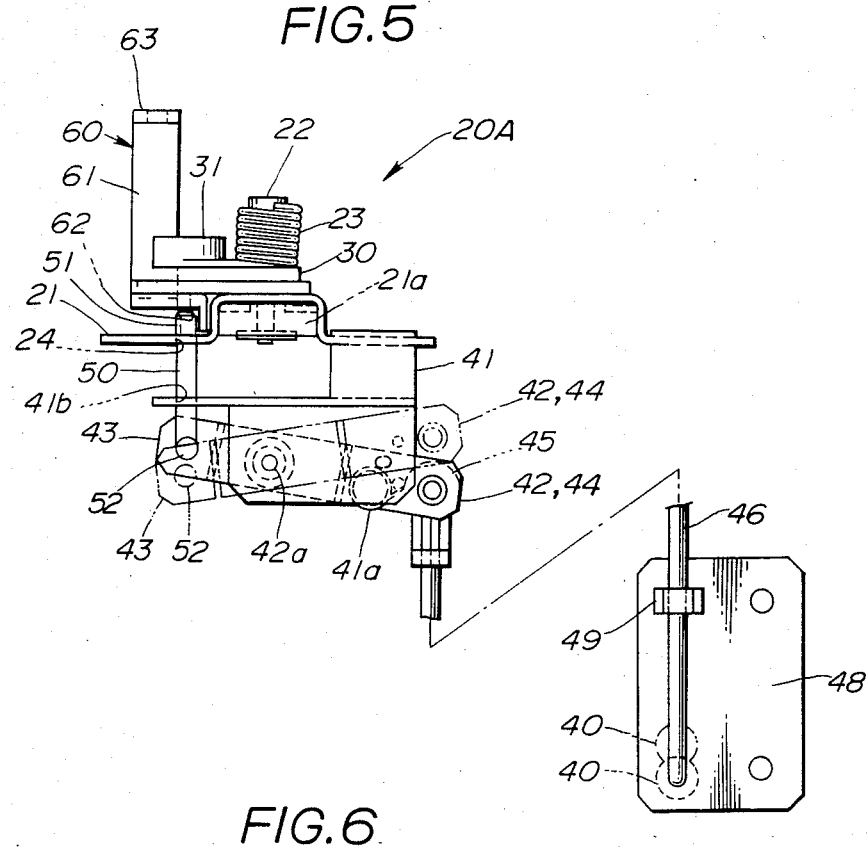
Figure 6:
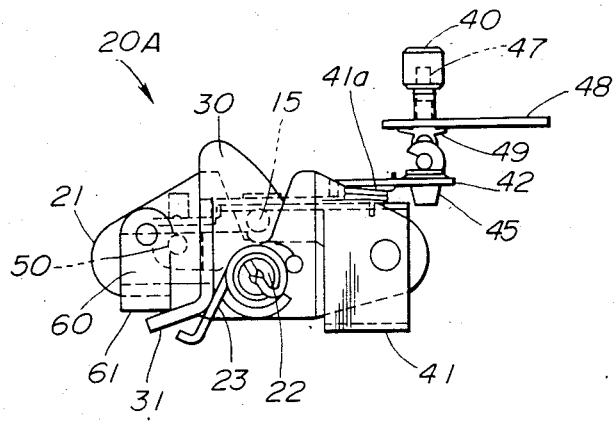

In the following, operation will be described with reference to the drawings, especially FIGS. 1, 2 and 5.

Figure 7:
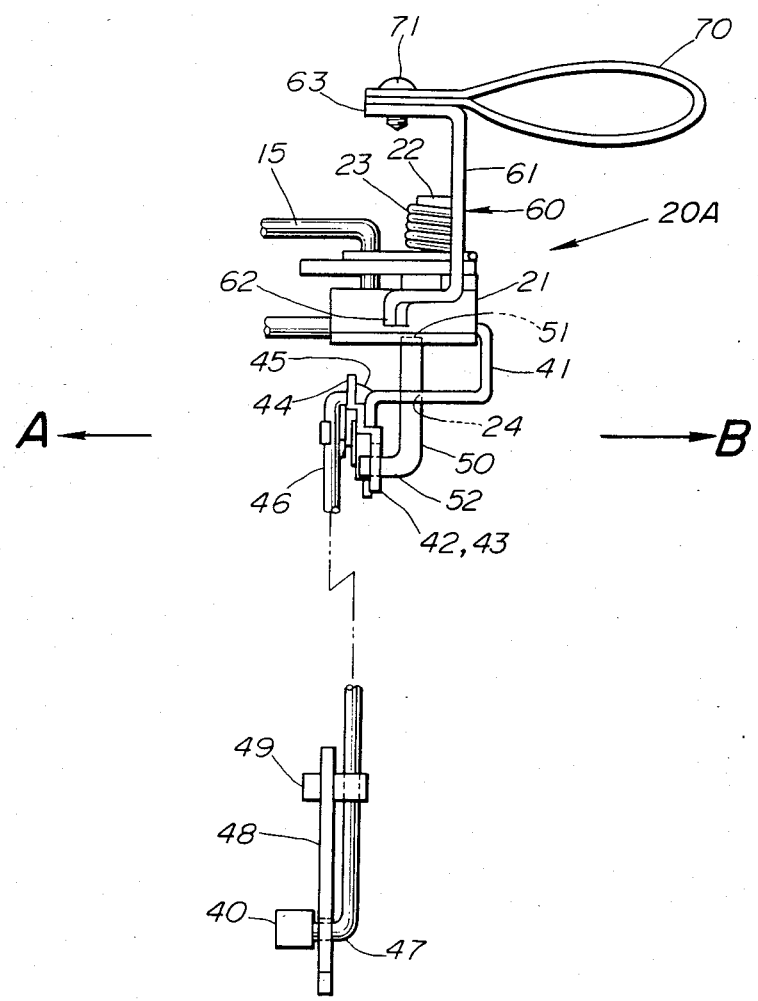

For ease of understanding, the description will be commenced with respect to a condition wherein the inclinable back rest cushion 11 is neatly received in the tunnel "T" with a part of the pull strap 70 exposed to the passenger room "B" and the stopper pin 50 assumes its inoperative (viz., lower) position. Under this condition, the latch member 30 is kept engaged with the striker 15 by the aid of the coil spring 23 and the control knob 40 assumes its uppermost position. That is, in this condition, the latch device assumes a condition as shown in FIG. 7.

When, for the purpose of inclining the back rest cushion 11, the pull strap 70 is pulled from the passenger room "B", the actuation member 60 is pivoted in a given direction (viz., in a counterclockwise direction in FIG. 1) pushing at the upwardly extending portion 61 thereof the bent end 31a of the latch member 30 in the same direction against the biasing force of the coil spring 23. With this, the latch member 30 is disengaged from the striker 15. Thus, further pulling of the strap 70 induces a forward inclination of the back rest cushion 11 as shown in FIG. 2.

When, for receiving the cushion 11 into the tunnel "T", the cushion 11 is raised and thrusted into the tunnel "T", the striker 15 is inserted into the slot 11a of the cushion 11 (see FIG. 2) and brought into contact with a curved head 30a of the latch member 30 (see FIG. 1). Pushing the cushion 11 with a certain force causes the striker 15 to push the head 30a of the latch member 30 away against the o biasing force of the spring 23 and thereafter become latched by the latch member 30 by the work of the spring 23. With this, the cushion 11 assumes the above-mentioned original latched position.

Figure 8:
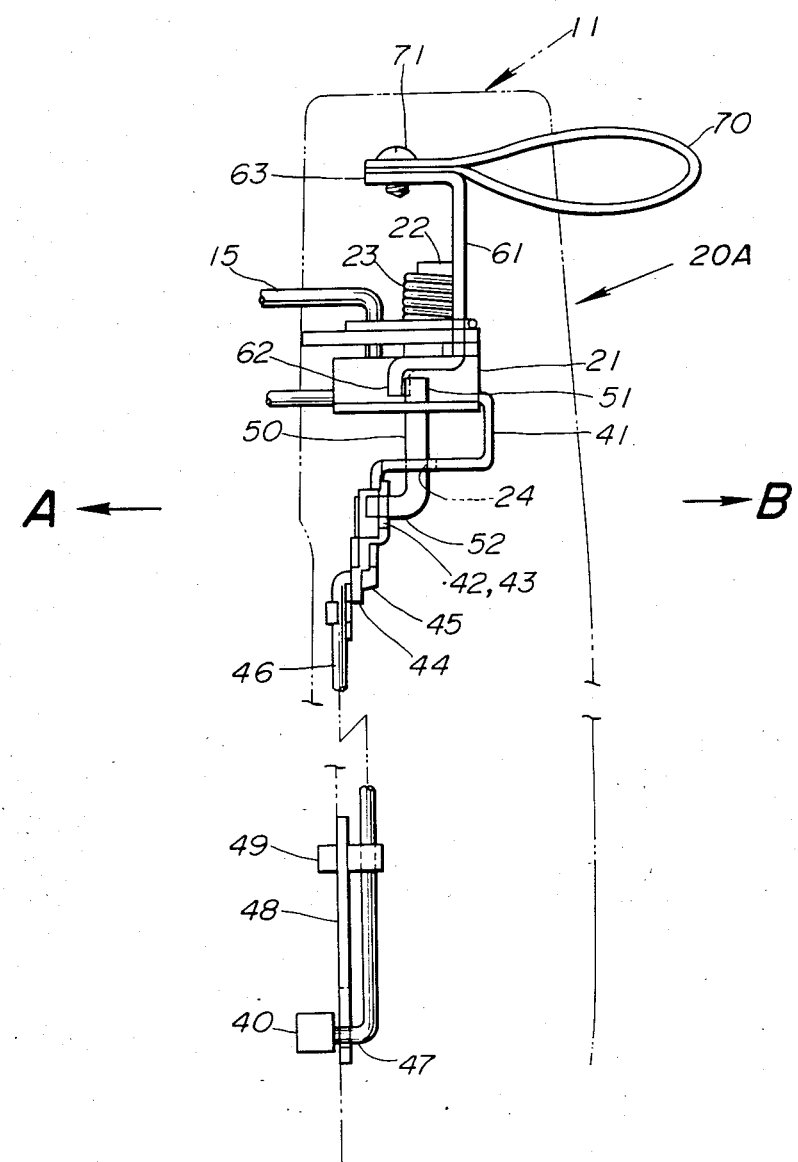

When now the control knob 40 is pushed down to its lowermost position from the trunk room "A" as is shown in FIG. 8, the stopper pin 50 is projected upward in a snap action manner and assumes its upper or operative position. Under this condition, the upwardly projected part 51 of the stopper pin 50 is placed on the travelling way of the downwardly extending portion 62 of the actuation member 60. Thus, pulling the pull strap 70 from the passenger room "B" can not bring about the pivotal movement of the actuation member 60. Thus, under this condition, the back rest cushion 11 can not be folded even when the pull strap 70 is pulled from the passenger room "B". During this invalid action, a considerable stress is applied to the stopper pin 50 from the actuation member 60. However, the stress is entirely received by the base member 21 which is tightly secured to the rigid frame member of the back rest cushion 11. Thus, deformation and/or breakage of the stopper pin 50 does not occur.

FIGS. 9 to 11 show a second embodiment of the present invention.

As will be clarified as the description proceeds, in a latch device 20B of the second embodiment, there are no members which correspond to the stopper pin 50 and the pivoting lever 42 of the first embodiment.

As is well seen from FIG. 9, the latch device 20B comprises a base member 85 which is secured to a rigid frame member (not shown) installed in a free upper portion 12 (see FIG. 2) of the back rest cushion 11. It is to be noted that the parts shown in FIG. 9 are so oriented that the left side of the drawing faces the passenger room "B" and the right side faces the trunk room "A". The base member 85 has a raised center portion (no numeral) for housing therein a bumper rubber piece 21a. The raised center portion is formed with a semicircular cut through which the bumper rubber piece 21a is exposed. For the purpose which will be clarified hereinafter, the base member 85 is formed with a generally U-shaped lower portion 85a, and aligned openings 86 and 87 are formed in opposed walls of the portion 85a. A guide plate 90 having an L-shaped cross section is bolted to the base member 85 in such a manner that an upper flat portion 90a thereof is attached to a lower side of the base member 85. The upper flat portion 90a is formed with an opening 91 which is mated with the opening 87 of the base member 85. Although not shown in the drawings, the other flat portion 90b of the guide plate 90 is tightly bolted to the frame member of the back rest cushion 11. A pivot shaft 22 is fixed to the raised center portion of the base member 85, which extends upward therefrom.

A latch member 30 is pivotally disposed about the pivot shaft 22. The latch member 30 is formed with a raised flange 31 having a bent end 31a. A coil spring 23 is disposed about the pivot shaft 22 having one end hooked to the raised flange 31 of the latch member 30 and the other end hooked to the pivot shaft 22. Thus, the latch member 30 is biased to rotate in a clockwise direction in FIG. 9, that is, in a direction to achieve latched engagement with the striker 15.

An actuation member 97 is also pivotally disposed about the pivot shaft 22 at a position between the base member 85 and the latch member 30. The actuation member 97 is formed with an upwardly extending portion 99 and a downwardly extending portion 98. As is seen from FIGS. 10 and 11, the upwardly extending portion 99 is placed behind the raised flange 31 of the latch member 30. A top of the upwardly extending portion 99 is bent to form a flat portion to which a pull strap 70 is connected through a screw 71. Usually, due to the biasing force of the spring 23, the bent end 31a of the latch member 30 abuts on the upwardly extending portion 99 of the actuation member 97 thereby to bias the same in a clockwise direction in FIG. 9. Thus, when the pull strap 70 is pulled against the biasing force of the spring 23, the latch member 30 is pivoted in a counterclockwise direction in FIG. 9 that is, in a direction to release the latched engagement between the latch member 30 and the striker 15. This latch releasing operation is suppressed by an interfering mechanism which will be described in the following.

The interfering mechanism comprises a stopper rod 80 which slidably passes through the opening 86 of the base member 85, the opening 91 of the guide plate 90 and the opening 87 of the base member 85. The openings 86, 91 and 87 are so positioned that when the rod 80 assumes its raised or upper position, it intersects the travelling way of the downwardly extending portion 98 of the actuation member 97. The stopper rod 80 has a straight upper portion 82 and a bent lower portion 81.

The stopper rod 80 is axially slidably connected through clips 49 and 49 to a plate member 95 which is secured to the back rest cushion 11. The plate member 95 is formed with an elongate slot 95a through which the bent lower portion 81 of the rod 80 is projected into the outside of the back rest cushion 11. A control knob 40 is fixed to the outwardly projected part of the bent lower portion 81. A turn over spring 41a is disposed between the rod 80 and the plate member 95 in order to make a turn over action of the stopper rod 80. Usually, due to work of the turn-over spring 41a, the control knob 40 assumes either one of the uppermost and lowermost positions defined by the elongate slot 95a of the plate member 95. As is understood from FIG. 10, when the control knob 40 assumes the uppermost position as illustrated by a solid line, the stopper rod 80 assumes its upper or operative position, that is, the position to interfere the pivotal movement of the actuation member 97, while, when the control knob 40 assumes the lowermost position as illustrated by a phantom line, the stopper rod 80 assumes its lower or inoperative position.

Figure 12:
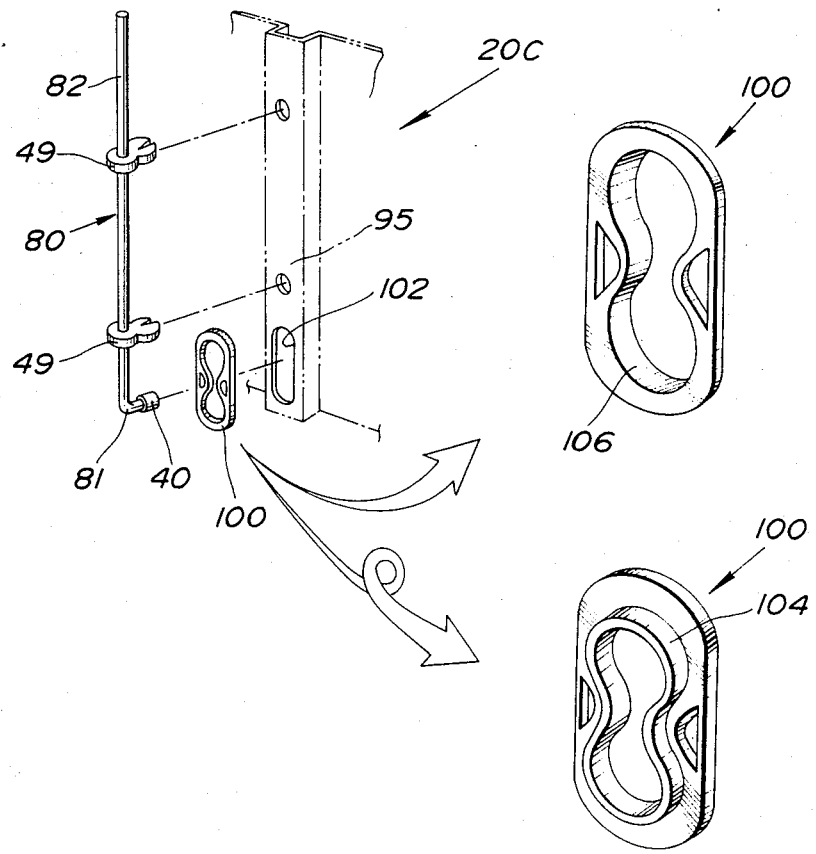
FIG. 12 is partial exploded view of a latch device of a third embodiment of the present invention.

FIG. 12 shows a part of a third embodiment 20C of the present invention. The latch device 20C of this third embodiment is substantially the same as that of the second embodiment 20B except for the part which brings about the turn over action of the stopper rod 80. That is, the part comprises an oval guide member 100 of plastics which is formed with a slot 106 the middle portion of which is narrowed. The guide member 100 is attached to an oval opening 102 formed in the plate member 95. For this attachment, the guide member 100 is formed at its one side with a collar 104 which is snugly received in the oval opening 102 and shaped to match with the aperture 106 of the guide member 100. The bent lower portion 81 of the rod 80 is passed through the aperture 106 to be projected into the outside of the back rest cushion 11 and fixed with the control knob 40. It is to be noted that the width of the narrowed portion of the aperture 106 of the guide member 100 is somewhat smaller than the diameter of the bent lower portion 81 of the rod 80. Thus, a so-called snap action movement is carried out by the rod 80 every time the bent lower portion 81 passes through the narrowed portion of the aperture 106.

Since operation of the latch devices 20B and 20C of the second and third embodiments will be easily understood from the operation of the first embodiment 20A, it will be omitted. Since, in the second and third embodiments, the number of parts used is less than that of the first embodiment, structural simplification of the latch device is much assured as compared with the device of the first embodiment. Furthermore, because of the reduced number of parts employed therein, possibility of malfunction of the device is reduced.

As will be understood from the foregoing description, the latch devices 20A, 20B and 20C of the invention are simple and compact in construction. Thus, not only space saving but also cost saving is assured, which have not been expected from the afore-mentioned conventional latch devices.

What is claimed is:

1. In a seatback which is provided, in a tunnel thereof, with an inclinable back rest cushion,
    a latch device for latching said back rest cushion to said seatback when said cushion is snugly received in said tunnel, which comprises:
    a striker secured to said seatback;
    a latch member pivotally mounted in said back rest cushion in a manner to latchingly engage with said striker upon said cushion being received in said tunnel;
    first means for biasing said latch member in a direction to achieve the latched engagement between said latch member and said striker;
    an actuation member pivotally mounted in said back rest cushion in a manner to push and pivot said latch member in a releasing direction to cancel the latched engagement between said latch member and said striker when pivoted in a give direction;
    second means for interrupting said actuation member from pivoting in said releasing direction, said second means including a stopper pin which is projectable into a travelling way of said actuation member, a pivoting lever pivotally mounted in said back rest cushion and having one end pivotally connected to said stopper pin, and an elongated rod having one end pivotally connected to the other end of said pivoting lever, said elongate rod having the other end which is exposed to the outside of said back rest cushion through an opening formed in a back portion of said back rest cushion;
    a base member secured to a rigid portion of said back rest cushion and having an opening through which said pin portion passes; and
    third means for manually actuating said second means form a back side of said back rest cushion.

2. A latch device as claimed in claim 1, further comprising fourth means which causes said second means to make said pin portion move in a snap action manner.

3. A latch device as claimed in claim 2, in which said latch member and said actuation member are arranged to pivot about a common axis.

4. A latch device as claimed in claim 3, in which said common axis is an axis possessed by a pivot pin which is secured to said base member.

5. A latch device as claimed in claim 4, in which said fourth means is a turn-over spring.

6. In a seatback which is provided, in a tunnel thereof, with an inclinable back rest cushion,
    a latch device for latching said back rest cushion to said seatback when said cushion is snugly received in said tunnel, which comprises:
    a striker secured to said seatback;
    a latch member pivotally mounted in said back rest cushion in a manner to latchingly engage with said striker upon said cushion being received in said tunnel;
    first means for biasing said latch member in a direction to achieve the latched engagement between said latch member and said striker;
    an actuation member pivotally mounted in said back rest cushion in a manner to push and pivot said latch member in a releasing direction to release the latched engagement between said latch member and said striker when pivoted in a given direction;
    second means including a stopper pin which is projectable into a travelling way of said actuation member from pivoting in said releasing direction;
    a base member secured to a rigid portion of said back rest cushion and having an opening through which said pin portion passes;
    third means for manually actuating said second means from a back side of said back rest cushion; and
    fourth means which causes said second means to make said stopper pin move in a snap action manner by a turn-over spring;
    wherein said latch member and said actuation member are arranged to pivot about a common axis;

said common axis is an axis possessed by a pivot pin which is secured to said base member;

said stopper pin having one end which passes through the opening of said base member; and said second means further comprises a pivoting lever pivotally mounted in said back rest cushion, said pivoting lever having one end pivotally connected to said stopper pin; and an elongate rod having one end pivotally connected to the other end of said pivoting lever, said elongated rod having the other end which is exposed to the outside of said back rest cushion to be manipulated.

7. A latch device as claimed in claim 6, in which said pivoting lever is pivotally held by a guide bracket which is secured to a rigid portion of said back rest cushion.

8. A latch device as claimed in claim 7, in which said guide bracket is formed with an extension which has an opening through which said stopper pin passes.

9. A latch device as claimed in claim 8, in which said turn-over spring is operatively disposed between said guide bracket and the other end of said pivoting lever thereby to bias said pivoting lever to swing in a snap action manner.

10. A latch device as claimed in claim 9, in which the other end of said elongate rod is equipped with a control knob.

11. A latch device as claimed in claim 10, in which said actuation member is equipped with a pull strap which is sized to be exposed to the outside of said tunnel even when said back rest cushion is neatly received in said tunnel.

12. A latch device as claimed in claim 10, further comprising a base plate which is secured to a rigid portion of said back rest cushion, said base plate having an elongate opening through which the other end of said elongate rod passes.

13. A latch device as claimed in claim 12, further comprising a holder which is fixed to said base plate to slidably hold said elongate rod.

14. A latch device as claimed in claim 4, in which said second means comprises an elongate rod having one end which passes through the opening of said base member and the other end which is exposed to the outside of said back rest cushion to be manipulated.

15. In a seatback which is provided, in a tunnel thereof, with an inclinable back rest cushion, a latch device for latching said back rest cushion to said seatback when said cushion is snugly received in said tunnel, which comprises:

a striker secured to said seatback;

a latch member pivotally mounted in said back rest cushion in a manner to latchingly engage with said striker upon said cushion being received in said tunnel;

first means for biasing said latch member in a direction to achieve the latched engagement between said latch member and said striker;

an actuation member pivotally mounted in said back rest cushion in a manner to push and pivot said latch member in a releasing direction to release the latched engagement between said latch member and said striker when pivoted in a given direction;

second means including a stopper pin which is projectable into a travelling way of said actuation member from pivoting in said releasing direction;

a base member secured to a rigid portion of said back rest cushion and having an opening through which said pin portion passes;

third means for manually actuating said second means from a back side of said back rest cushion; and fourth means which causes said second means to make said stopper pin move in a snap action manner;

wherein said latch member and said actuation member are arranged to pivot about a common axis;

said common axis is an axis possessed by a pivot pin which is secured to said base member;

said second means further comprises an elongate rod having one end which passes through the opening of said base member and the other end which is exposed to the outside of said back rest cushion to be manipulated; and said base member is formed with a bent portion having another opening through which said elongate rod passes.

16. A latch device as claimed in claim 15, further comprising a guide plate which is secured to a rigid portion of said back rest cushion and has an opening through which said elongate rod passes.

17. A latch device as claimed in claim 16, further comprising a plate member which is secured to the rigid portion of said back rest cushion, said plate member being formed with an elongate opening through which the other end of said elongate rod passes.

18. A latch device as claimed in claim 17, further comprising holders which are connected to said plate member to slidably hold said elongate rod.

19. A latch device as claimed in claim 18, in which said fourth means is a turn-over spring.

20. A latch device as claimed in claim 19, in which said turn-over spring is disposed between said elongate rod and said plate member thereby to bias said elongate rod to move in a snap action manner.

21. A latch device as claimed in claim 18, in which said fourth means comprises:

an elastic guide member fixed to said elongate opening of said plate member, said guide member having an aperture through which the other end of said elongate rod passes; and means defining in the aperture of said guide member a narrowed portion the width of which is smaller than the diameter of the other end of said elongate rod.

* * * * *